(12) United States Patent
Suzuki et al.

(10) Patent No.: US 7,838,450 B2
(45) Date of Patent: Nov. 23, 2010

(54) OPTICAL GLASS

(75) Inventors: Junko Suzuki, Kawasaki (JP);
Masahiro Onozawa, Sagamihara (JP)

(73) Assignee: Ohara Inc., Sagamihara-shi (JP)

( * ) Notice: Subject to any disclaimer, the term of this patent is extended or adjusted under 35 U.S.C. 154(b) by 122 days.

(21) Appl. No.: 11/870,282

(22) Filed: Oct. 10, 2007

(65) Prior Publication Data

US 2008/0085825 A1 Apr. 10, 2008

(30) Foreign Application Priority Data

Oct. 10, 2006 (JP) .............................. 2006-276901

(51) Int. Cl.
*C03C 3/17* (2006.01)
*C03C 3/247* (2006.01)
(52) U.S. Cl. .............................. 501/44; 501/47; 501/48
(58) Field of Classification Search ................... 501/44, 501/47, 48
See application file for complete search history.

(56) References Cited

U.S. PATENT DOCUMENTS

| | | | | |
|---|---|---|---|---|
| 4,120,814 A | * | 10/1978 | Izumitani et al. ...... | 252/301.4 P |
| 4,358,543 A | * | 11/1982 | Nozawa ........................ | 501/40 |
| 4,363,879 A | * | 12/1982 | Broemer et al. ................ | 501/44 |
| 4,808,556 A | * | 2/1989 | Sawanobori et al. .......... | 501/44 |
| 4,857,487 A | * | 8/1989 | Broemer et al. ................ | 501/44 |
| 5,242,868 A | * | 9/1993 | Hara ........................... | 501/44 |
| 5,246,891 A | * | 9/1993 | Nakamura ................... | 501/44 |
| 5,635,109 A | * | 6/1997 | Otsuka .................. | 252/301.4 P |

FOREIGN PATENT DOCUMENTS

| | | | |
|---|---|---|---|
| JP | 56-054249 A | | 5/1891 |
| JP | 60-081042 A | | 5/1985 |
| JP | 60-210545 A | | 10/1985 |
| JP | 63-144141 A | | 6/1988 |
| JP | 01-270537 A | | 10/1989 |
| JP | 02-283635 A | | 11/1990 |
| JP | 05-238775 A | | 9/1993 |
| JP | 2002234753 | * | 8/2002 |

OTHER PUBLICATIONS

German Office Action dated Aug. 14, 2009, issued in corresponding German Patent Application No. 10 2007 047 490.5-45.
Japanese Office Action mailed on Jan. 5, 2010, issued in corresponding Japanese Patent Application No. 2006-276901.

* cited by examiner

*Primary Examiner*—Karl E Group
(74) *Attorney, Agent, or Firm*—Westerman, Hattori, Daniels & Adrian, LLP

(57) ABSTRACT

An optical glass having a refractive index (nd) within a range from 141 to 1.47 and an Abbe number (vd) within a range from 90 to 100 comprises in mass % on element basis:

| | |
|---|---|
| P | 0.1-5.0% |
| Al | 1.0-20.0% |
| F | 30.0-60.0% and |
| O | 1.0-20.0% | and comprises, as an essential component, one or more elements selected from the group consisting of Ca, Sr and Ba. In this optical glass, the ratio (Si+B+P+Al)/F is within a range from 0.15 to 0.40.

15 Claims, 1 Drawing Sheet

OPTICAL GLASS

BACKGROUND OF THE INVENTION

This invention relates to a ultra-low refractive index and ultra-low dispersion glass having a refractive index (nd) of 1.41-1.47 and an Abbe number (vd) of 90-100 and optical elements such as lenses and prisms which are obtained by using this glass. More particularly, this invention relates to a raw material composition and a manufacturing method which can effectively prevent devitrification (precipitation of crystals) which occurs during cooling from a molten state of glass which is a serious problem in manufacture of a glass. The invention provides glass materials suitable for use as projection lenses and prisms of optical instruments represented by a camera and a projector for which a high precision chromatic aberration characteristic is required. The invention also provides optical elements and optical instruments using the optical glass of the invention.

A low refractive index and low dispersion glass material has a characteristic that change (dispersion) in the refractive index depending upon wavelength of light is small and therefore is suitable for lenses and prisms of optical instruments for which a high precision chromatic aberration characteristic is required. In the past, $CaF_2$ crystal which is a crystalline material was used. Since it is difficult to produce a uniform and large crystal with this material and great care must be taken for processing the crystal, recent tendency is to use a glass material which is superior to a crystal material in easiness in processing and also in chemical durability. As glass materials, various glass compositions and mixed compositions are disclosed in Japanese Patent Application Laid-open Publication Nos. 60-210545, 63-144141, and 6-191876.

For realizing low refractive index and low dispersion properties in a glass material, a large amount of anion component (typically fluorine component) other than oxide ion must be introduced into glass. Since, however, glass containing a large amount of fluorine component is inferior in resistance to devitrification, devitrification occurs during cooling of a glass melt with the result that it is difficult to produce a homogeneous glass stably in a large scale production and this hinders production of the glass with high productivity.

In the above mentioned Japanese Patent Application Laid-open Publication Nos. 60-210545 and 6-191876, improvement in resistance to devitrification is discussed but, in these literature, consideration is made only for improvement in resistance to devitrification by holding the glass during a short period of time of one to two hours in the vicinity of the glass forming temperature. No sufficient consideration has been made in these literature for improving resistance to devitrification during a long period of time which can be applied to a continuous melting and glass-forming production system which has high productivity.

Japanese Patent Application Laid-open Publication No. 9-142875 discloses a method of manufacturing a fluoride complex phosphate optical glass for the purpose of preventing forming of devitrification and striae. In this method, however, if it is desired to obtain a large-size glass material while maintaining a high glass casting temperature, glass forming has to be made in a low viscosity region and this will cause difficulty in controlling the flow amount of glass precisely and, as a result, a non-uniform striped portion (striae) tends to be produced by the flow of glass. Besides, since glass has small heat conductivity, the inside portion of the glass which is difficult to cool compared with the surface portion of the glass has longer time during which the glass is subject to devitrification. Thus, there is likelihood that devitrification occurs in the inside portion of the glass and, therefore, improvement in this literature against devitrification cannot be said sufficient.

It is, therefore, an object of the invention to provide a ultra-low refractive index and ultra-low dispersion optical glass having a refractive index (nd) of 1.41-1.47 and an Abbe number (vd) of 90-100 which can be obtained stably by using a commonly used melting method without using a special material or a special melting crucible or a special melting method.

SUMMARY OF THE INVENTION

For achieving the above object of the invention, studies and experiments made by the inventors of the present invention have resulted in the finding, which has led to the present invention, that occurrence of devitrification in the inside portion of glass during cooling of the glass after melting can be effectively prevented while desired refractive index and Abbe number can be maintained by adjusting the ratio (Si+B+P+Al)/F in mass % on element basis to a value within a range from 0.20 to 0.40 in a glass material composition comprising P, Al, Ca, Sr, Ba, Y, F and O and adjusting the composition ratio of the component elements.

The present invention will now be summarized as follows;

Aspect 1

An optical glass having a refractive index (nd) within a range from 1.41 to 1.47 and an Abbe number (vd) within a range from 90 to 100, comprising in mass % on element basis:

| | |
|---|---|
| P | 0.1-5.0% |
| Al | 1.0-20.0% |
| F | 30.0-60.0% and |
| O | 1.0-20.0% and | comprising, as an essential component, one or more elements selected from the group consisting of Ca, Sr and Ba, wherein (Si+B+P+Al)/F is within a range from 0.15 to 0.40.

Aspect 2

An optical glass having a refractive index (nd) within a range from 1.41 to 1.47 and an Abbe number (vd) within a range from 90 to 100, comprising in mass % on element basis:

| | |
|---|---|
| P | 0.1-5.0% |
| Al | 1.0-20.0% |
| Ca | 1.0-20.0% |
| Sr | 1.0-20.0% |
| Ba | 1.0-20.0% |
| F | 30.0-60.0% and |
| O | 1.0-20.0% |
| Mg | 0-10.0% |
| Y | 0-10.0% | wherein (Si+B+P+Al)/F is within a range from 0.15 to 0.40.

Aspect 3

An optical glass having a refractive index (nd) within a range from 1.42 to 1.46 and an Abbe number (vd) within a range from 92 to 98, comprising in mass % on element basis:

| | |
|---|---|
| P | 0.5-5.0% |
| Al | 3.0-19.0% |
| Ca | 3.0-less than 17.5% |
| Sr | 8.0-19.0% |
| Ba | 3.0-18.0% |
| F | 32.0-58.0% |
| O | 1.0-18.0% |
| Mg | 0.3-8.0% |
| Y | 0.01-8.0% and |
| La | 0-5.0% and/or |
| Gd | 0-5.0% and/or |
| Li | 0-3.0% and/or |
| Na | 0-3.0% |
| K | 0-3.0% | wherein (Si+B+P+Al)/F is within a range from 0.18 to 0.37 and Ba/Sr is within a range from 0.6 to 1.0.

Aspect 4

An optical glass having a refractive index (nd) within a range from 1.41 to 1.47 and an Abbe number (vd) within a range from 90 to 100 which is obtained by melting a glass material composition comprising:
P introduced from a complex phosphate material,
at least one of Al, Mg, Ca, Sr and Ba introduced from a material which comprises a complex phosphate and/or a fluoride as an essential component, and
at least one of Y, La, Gd, Li, Na and K introduced from a material which comprises a fluoride as an essential component, wherein (Si+B+P+Al)/F in mass % on element basis of a total mass of a glass materials is adjusted to a value within a range from 0.20 to 0.40.

Aspect 5

An optical glass as defined in Aspect 4 obtained by melting a glass material composition comprising, in mass % on element basis of a total mass of glass materials:

| | |
|---|---|
| P introduced from a complex phosphate material | 1.0-5.0% |
| Al introduced from a material which comprises a complex phosphate and/or a fluoride as an essential component | 1.0-20.0% |
| Mg introduced from a material which comprises a complex phosphate and/or a fluoride as an essential component | 0-5.0% |
| Ca introduced from a material which comprises a complex phosphate and/or a fluoride as an essential component | 1.0-20.0% |
| Sr introduced from a material which comprises a complex phosphate and/or a fluoride as an essential component | 1.0-20.0% |
| Ba introduced from a material which comprises a complex phosphate and/or a fluoride as an essential component | 1.0-20.0% |
| Y introduced from a material which comprises a fluoride as an essential component | 0.01-8.0% |
| La introduced from a material which comprises a fluoride as an essential component | 0-5.0% |
| Gd introduced from a material which comprises a fluoride as an essential component | 0-5.0% |
| Li introduced from a material which comprises a fluoride as an essential component | 0-3.0% |
| Na introduced from a material which comprises a fluoride as an essential component | 0-3.0% |
| K introduced from a material which comprises a fluoride as an essential component | 0-3.0% |
| F introduced from a material which comprises a fluoride as an essential component | 35-65% |
| Cl introduced from a chloride material | 0-3.0% |
| Br introduced from a bromide material | 0-5.0% |
| I introduced from an iodide material | 0-5.0% and |
| O introduced from complex phosphate and oxide materials | 0.1-10% | wherein (Si+B+P+Al)/F is adjusted to a value within a range from 0.20 to 0.40.

Aspect 6

An optical glass as defined in Aspect 4 or 5 obtained by melting a glass material composition comprising, in mass % on element basis of a total mass of glass materials:

| | |
|---|---|
| P introduced from a complex phosphate material | 1.0-5.0% |
| Al introduced from a material which comprises a complex phosphate and/or a fluoride | 3.0-19.0% |
| Mg introduced from a material which comprises a complex phosphate and/or a fluoride | 0.3-4.0% |
| Ca introduced from a material which comprises a complex phosphate and/or a fluoride | 3.0-less than 17.5% |
| Sr introduced from a material which comprises a complex phosphate and/or a fluoride | 8.0-19.0% |
| Ba introduced from a material which comprises a complex phosphate and/or a fluoride | 3.0-18.0% |
| where (Sr + Ba) which is a sum in mass % | 20.0-35.0% |
| Y introduced from a material which comprises a fluoride | 0.5-6.0% |
| La introduced from a material which comprises a fluoride | 0-4.0% |
| Gd introduced from a material which comprises a fluoride | 0-4.0% |
| Li introduced from a material which comprises a fluoride | 0-2.0% |
| Na introduced from a material which comprises a fluoride | 0-2.0% |
| K introduced from a material which comprises a fluoride | 0-1.0% |
| F introduced from a material which comprises a fluoride | 40-55% |
| Cl introduced from a chloride material | 0-1.0% |
| Br introduced from a bromide material | 0-1.0% |
| I introduced from an iodide material | 0-1.0% |
| O introduced from complex phosphate and oxide materials | 0.5-8% |
| Si | less than 0.2% |
| B | less than 0.5% |
| Sb | 3% or below | wherein (Si+B+P+Al)/F is adjusted to a value within a range from 0.27 to 0.35 and Ba/Sr is adjusted to a value within a range from 0.6 to 1.0.

Aspect 7

An optical glass obtained by melting a glass material wherein (Si+B+P+Al)/F in mass % on element basis of a total mass of glass materials is adjusted to a value within a range from 0.15 to 0.40, said glass material comprising in mass % of a total mass of glass materials:

| | |
|---|---|
| Al(PO$_3$)$_3$ | 2.0-10.0% |
| AlF$_3$ | 20-35% |
| CaF$_2$ | 15-25% |
| SrF$_2$ | 15-28% |
| BaF$_2$ | 5-20% and |
| YF$_3$ | 0.1-10.0%. |

Aspect 8

An optical glass as defined in any of Aspects 1-6 which is obtained by melting a glass material composition wherein (Si+B+P+Al)/F in mass % on element basis of a total mass of glass materials is adjusted to a value within a range from 0.18 to 0.37, said glass material composition comprising in mass % of the total mass of glass materials:

| | |
|---|---|
| Al(PO$_3$)$_3$ | 2.0-10.0% |
| AlF$_3$ | 20-35% |
| CaF$_2$ | 15-25% |
| SrF$_2$ | 15-28% |
| BaF$_2$ | 5-20% and |
| YF$_3$ | 0.1-10.0%. |

Aspect 9

An optical glass as defined in Aspect 7 or 8 which is obtained by melting a glass material composition wherein (Si+B+P+Al)/F in mass % on element basis of a total mass of glass materials is adjusted to a value within a range from 0.18 to 0.37 and Ba/Sr is adjusted to a value within a range from 0.6 to 1.0, said glass material composition comprising in mass % of a total mass of glass materials:

| | |
|---|---|
| Al(PO$_3$)$_3$ | 2.5-10.0% |
| AlF$_3$ | 22-33% |
| MgF$_2$ | 1.0-7.0% |
| CaF$_2$ | 16-24% |
| where (MgF$_2$ + CaF$_2$)/(Al (PO$_3$)$_3$ + AlF$_3$) in mass % is less than 0.77 | |
| SrF$_2$ | 15.5-27% |
| BaF$_2$ | 6-18% and |
| YF$_3$ | 0.5-9.0%. |

Aspect 10

An optical glass as defined in any of Aspects 1-9 which comprises Si and/or B in an amount within a range from 0.005% to less than 0.2% which are introduced from materials excluding oxides.

Aspect 11

An optical glass as defined in any of Aspects 1-10 obtained by melting a glass material composition which is free of SiO$_2$, B$_2$O$_3$, Ba(PO$_3$)$_2$, BaCl$_2$, LiF, NaF, KF, LiPF$_6$, NaPF$_6$ and KPF$_6$.

Aspect 12

An optical glass having a refractive index (nd) within a range from 1.42 to 1.46 and an Abbe number (vd) within a range from 92 to 98 which is obtained by melting a glass material composition wherein (Si+B+P+Al)/F in mass % on element basis of a total mass of glass materials is adjusted to a value within a range from 0.18 to 0.37 and Ba/Sr is adjusted to a value within a range from 0.6 to 1.0, said glass material composition comprising in mass % of a total mass of glass materials:

| | |
|---|---|
| Al(PO$_3$)$_3$ | 2.5-10.0% |
| AlF$_3$ | 22-33% |
| MgF$_2$ | 1.0-7.0% |
| CaF$_2$ | 16-24% |
| where (MgF$_2$ + CaF$_2$)/(Al (PO$_3$)$_3$ + AlF$_3$) in mass % is less than 0.73 | |
| SrF$_2$ | 15.5-27% |
| BaF$_2$ | 6-18% |
| YF$_3$ | 0.5-9.0% |
| Na$_2$SiF$_6$ | 0-3.0% |
| K$_2$SiF$_6$ | 0-3.0% |
| where (NaSiF$_6$ + K$_2$SiF$_6$) which is a sum in mass % | 0.01-5.0% |
| KHF$_2$ | 0.1-3.0% and |
| NH$_4$F•HF | 0-1.0% |
| and said glass material composition being free of SiO$_2$, B$_2$O$_3$, Ba(PO$_3$)$_2$, BaCl$_2$, LiF, NaF, KF, LiPF$_6$, NaPF$_6$ and KPF$_6$. | |

Aspect 13

An optical glass as defined in Aspect 12 comprising in mass % of a total mass of the glass materials:

| | |
|---|---|
| Na$_2$SiF$_6$ | 0-3.0% |
| K$_2$SiF$_6$ | 0-3.0% |
| where (NaSiF$_6$ + K$_2$SiF$_6$) is | 0.03-4.0% |

Aspect 14

An optical glass as defined in any of Aspects 1-13 wherein devitrification does not occur inside of the glass when the glass is melted at 1000° C. and cooled to 690° C. and then is held for 60 hours at 690° C.

Aspect 15

An optical glass as defined in any of Aspects 1-14 wherein difference between devitrification disappearing temperature (Tm) during the temperature elevation process and devitrification temperature (Tx) which is calculated from devitrification starting temperature during the temperature falling process in DTA measurement is 15° C. or over.

Aspect 16

An optical glass as defined in any of Aspects 1-15 wherein acid-proof property of the glass measured in accordance with JOGIS 06[1999] "Method for Measuring Chemical Durability of Optical Glass (Powder Method)" is Class 1 to Class 3.

Aspect 17

An optical element made of an optical glass as defined in any of Aspects 1-16.

Aspect 18

An optical element made by reheat pressing an optical glass as defined in any of Aspects 1-16.

Aspect 19

An optical instrument using an optical element or an optical substrate material made of an optical glass as defined in any of Aspects 1-16.

BRIEF DESCRIPTION OF THE DRAWING

In the accompanying drawing.

DETAILED DESCRIPTION OF THE INVENTION

Figure 1:
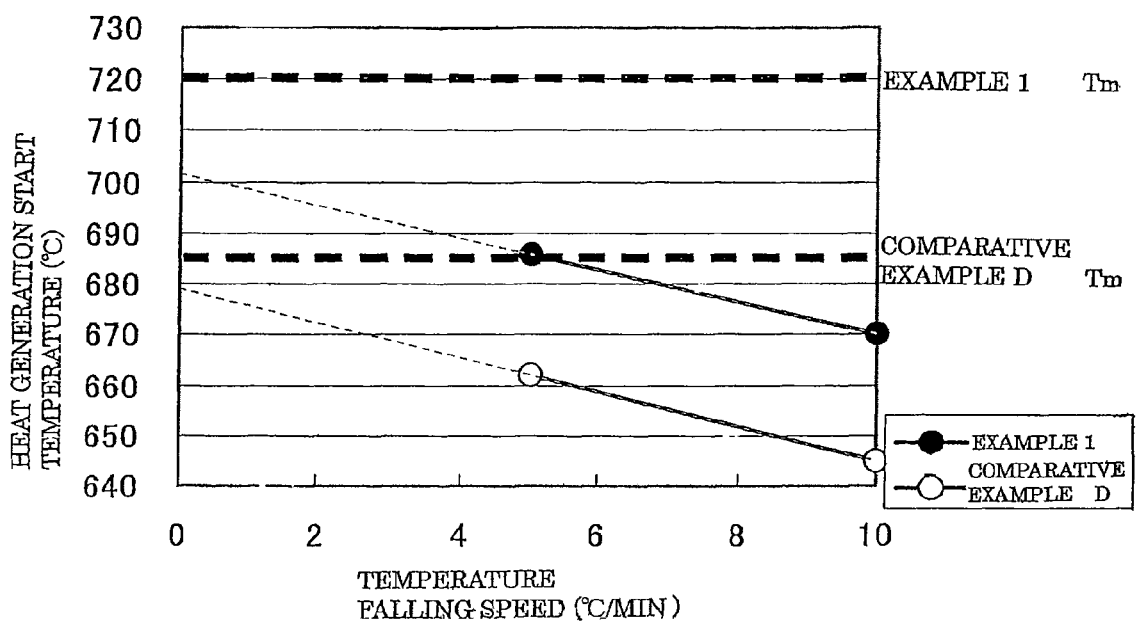
FIG. 1 is a diagram for explaining calculation of devitrification disappearing temperature (Tm)° C. and devitrification starting temperature (Tx)° C.

Description will be made first about Aspects 1-3 of the present invention. In Aspects 1-3, amounts of respective components contained in glass which is finally produced after melting glass materials are expressed in mass % on element basis.

The glass of Aspect 1 is characterized by having a refractive index (nd) within a range from 1.41 to 1.47 and an Abbe number (vd) within a range from 90 to 100, comprising in mass % on element basis:

| | |
|---|---|
| P | 0.1-5.0% |
| Al | 1.0-20.0% |
| F | 30.0-60.0% and |
| O | 1.0-20.0% and | comprising, as an essential component, one or more elements selected from the group consisting of Ca, Sr and Ba, and, in the glass, the ratio (Si+B+P+Al)/F is within a range from 0.15 to 0.40.

For realizing low refractive index and low dispersion properties, a large amount of F must be introduced in the glass and, for forming the glass framework with P, Al, F and O, these elements are essential elements. If the amount of each of P, Al, F and O is too small, total sum of glass modifying elements becomes excessively large against total sum of the glass framework elements and, as a result, it becomes difficult to form a stable glass framework.

Advantageous results of adding each of these elements and a preferable amount of each of these elements will now be described.

P is effective for improving mechanical property of the glass and thereby preventing cracking of the glass during cutting and polishing processes. If the amount of P is too small, it is difficult to form a stable glass framework and besides improvement in the mechanical property cannot be achieved. Therefore, the lower limit of the amount of this component should preferably be 0.1%, more preferably be 0.5% and, most preferably be 1.0%. On the other hand, if the amount of P is excessively large, the glass framework becomes stable but refractive index and dispersion tend to become large and, as a result, desired refractive index and dispersion cannot be achieved. Therefore, the upper limit of the amount of this component should preferably be 5.0%, more preferably be 4.8% and, most preferably be 4.5%.

Al is a main glass framework component in the glass of the present invention and is effective for improving the mechanical property and also reducing an average linear expansion coefficient ($\alpha$) and improving chemical durability of the glass. If the amount of Al is too small, it becomes difficult to form a stable glass framework and achieve the above described effects. Therefore, the lower limit of the amount of this component should preferably be 1.0%, more preferably be 3.0% and, most preferably be 8.0%. On the other hand, if the amount of Al is excessively large, cracking of the glass tends to occur and, besides, devitrification tends to occur during cooling of a melt. Therefore, the upper limit of the amount of this component should preferably be 20.0%, more preferably be 19.0% and, most preferably be 18.0%.

F is a main glass framework component and also is effective for reducing refractive index and dispersion. If the amount of F is too small, refractive index and dispersion tend to become large with resulting occurrence of difficulty in achieving desired optical properties. Therefore, the lower limit of the amount of this component should preferably be 30%, more preferably be 32% and, most preferably be 35%. On the other hand, if the amount of F is excessively large, ionic bond in the glass increases and, as a result, devitrification due to ionic bond crystals tend to be produced during cooling of the melt. Therefore, the upper limit of the amount of this component should preferably be 60.0%, more preferably be 58.0% and, most preferably be 55.0%.

O is a glass framework component and also is effective for improving the mechanical property of the glass and adjusting refractive index. If the amount of O is too small, the above effects cannot be achieved sufficiently. Therefore, the lower limit of the amount of this component should preferably be 1.0%, more preferably be 1.2% and, most preferably be 1.5%. On the other hand, if the amount of O is excessively large, it becomes difficult to achieve a desired refractive index and, besides, covalent bond in the glass increases and, as a result, devitrification occurs due to production of oxide crystals having a high melting point during cooling of the melt. Therefore, the upper limit of the amount of this component should preferably be 20.0%, more preferably be 18.0% and, most preferably be 15.0%.

For realizing desired low refractive index and low dispersion properties and producing a glass having such properties stably, it is preferable for the glass to comprise at least one element of Ca, Sr and Ba as a glass modifying component. The glass modifying component facilitates improvement in resistance to devitrification and adjustment of refractive index and dispersion. Although elements producing such glass modifying effect are not limited to Ca, Sr and Ba, it is advantageous to introduce cation elements such as Ca, Sr and Ba having a relatively large ionic radius for obtaining the low refractive index and low dispersion glass of the present invention. Therefore, at least one of Ca, Sr and Ba, more preferably two of these elements and, most preferably three of these elements, should be added as an essential component or components.

The ratio (Si+B+P+Al)/F in mass % on element basis is an index for judging resistance to devitrification of the glass and should preferably be within a range from 0.15 to 0.40. In the numerator of this ratio, Si and B are components which, as will be described later, improve resistance to devitrification by addition of a small amount thereof, and P and Al are components which form a framework of the glass (cation components) and also increase viscosity of the glass melt and improve resistance to devitrification. On the other hand, F in the denominator of this ratio is effective for reducing viscosity of the glass melt and, therefore, if the amount of F is excessively large, resistance to devitrification will be deteriorated. If this ratio is too small, viscosity of the glass melt is low and forming of a glass product thereby becomes difficult and, besides, resistance to devitrification tends to be deteriorated with resulting difficulty in realizing a large scale production. On the other hand, if this ratio is excessively large, the amount of F in the glass framework is relatively too small and, as a result, resistance to devitrification becomes deteriorated and achievement of desired optical constants (particularly low dispersion) becomes difficult. Therefore, the upper limit of this ratio should preferably be 0.40, more preferably be 0.37 and, most preferably be 0.35 whereas the lower limit of this ratio should preferably be 0.15, more preferably be 0.18 and, most preferably be 0.20.

Si and B are elements, which, as will be described later, have a relatively small ionic radius and, it has been found that, by presence of a suitable amount of these elements in the glass, change from an amorphous state to a crystalline state of the glass can be effectively prevented without substantially changing the glass framework formed by main components. The glass of the present invention can be obtained even if these elements are not added but, for improving resistance to devitrification of the glass, each of these elements may be added in an amount of less than 0.2%. On the other hand, if the amount of these elements is excessively large, crystals of covalent bond tend to precipitate and it becomes difficult to achieve low refractive index and low dispersion properties. Therefore, the upper limit of each of these elements should be less than 0.2%, more preferably be 0.195% and, most preferably be 0.19%.

Glass having a refractive index (nd) within a range from 1.41 to 1.47 and an Abbe number (vd) within a range from 90 to 100 has a small change in refractive index against change in light wavelength (i.e., dispersion) even when this glass alone is used for producing a lens and, therefore, is useful for an optical instrument such as a camera which uses light in the visible region. In the optical design in which this glass is combined with a high refractive index and high dispersion glass, a high precision optical instrument of a compact design having a small chromatic aberration can be realized and, therefore, this glass is a very useful material for industrial applications.

The glass of Aspect 2 is characterized by having a refractive index (nd) within a range from 1.41 to 1.47 and an Abbe number (vd) within a range from 90 to 100, comprising in mass % on element basis:

| | |
|---|---|
| P | 0.1-5.0% |
| Al | 1.0-20.0% |
| Ca | 1.0-20.0% |
| Sr | 1.0-20.0% |
| Ba | 1.0-20.0% |
| F | 30.0-60.0% and |
| O | 1.0-20.0% |
| Mg | 0-10.0% |
| Y | 0-10.0% | wherein (Si+B+P+Al)/F is within a range from 0.15 to 0.40.

Description of the components which have already been described above will be omitted.

Among the glass modifying components, Ca is effective for improving chemical durability of the glass while realizing the low dispersion property. For achieving this effect sufficiently, the lower limit of the amount of this component should preferably be 1.0%, more preferably be 3.0% and, most preferably be 7.0%. On the other hand, if the amount of this component is excessively large, crystals of ionic bond with F which is a main glass framework component tend to be produced. Therefore, the upper limit of this component should preferably be 20.0%, more preferably be less than 17.5% and, most preferably be less than 12.0%

Among the glass modifying components, Sr is effective for adjusting refractive index and also is effective for improving resistance to devitrification when it coexists with other divalent element (particularly an alkaline earth element). For achieving this effect sufficiently, the lower limit of the amount of this component should preferably be 1.0%, more preferably be 8.0% and, most preferably be 12.0%. On the other hand, if the amount of this component is excessively large, refractive index tends to become too high and, as a result, desired low refractive index and low dispersion properties cannot be achieved and, besides, resistance to devitrification tends to be deteriorated. Therefore, the upper limit of this component should preferably be 20.0%, more preferably be 19.0% and, most preferably be 18.0%

Among the glass modifying components, Ba is effective for adjusting refractive index and also is effective for improving resistance to devitrification. For achieving this effect sufficiently, the lower limit of the amount of this component should preferably be 1.0%, more preferably be 3.0% and, most preferably be 5.0%. On the other hand, if the amount of this component is excessively large, refractive index tends to become too high and, besides, specific gravity of the glass obtained becomes too large and chemical durability of the glass tends to be deteriorated. Therefore, the upper limit of this component should preferably be 20.0%, more preferably be 18.0% and, most preferably be 15.0%

Mg functions as a glass modifying component which is effective for adjusting refractive index and improving chemical durability and may be added as an optional component. The glass of the present invention can be obtained even if Mg is not added but it is preferable to add this component for improving chemical durability. The lower limit of this component should preferably be 0.3%, more preferably be 0.5% and, most preferably be 0.6%. On the other hand, if this component is added excessively, resistance to devitrification is seriously deteriorated and, therefore, the upper limit of this component should preferably be 10.0%, more preferably be 8.0% and, most preferably be 5.0%.

Y is a trivalent glass modifying component and is effective for adjusting refractive index and improving resistance to devitrification and therefore may be added as an optional component. The glass of the present invention can be obtained even if Y is not added but it is preferable to add this component for improving resistance to devitrification while realizing a desired refractive index. The lower limit of this component should preferably be 0.01%, more preferably be 0.5% and, most preferably be 1.0%. On the other hand, if this component is added excessively, refractive index increases to a value which is more than necessary and, therefore, the upper limit of this component should preferably be 10.0%, more preferably be 8.0% and, most preferably be 6.0%.

The optical glass of Aspect 3 is characterized by having a refractive index (nd) within a range from 1.42 to 1.46 and an Abbe number (vd) within a range from 92 to 98, comprising in mass % on element basis:

| | |
|---|---|
| P | 0.5-5.0% |
| Al | 3.0-19.0% |
| Ca | 3.0-less than 17.5% |
| Sr | 8.0-19.0% |
| Ba | 3.0-18.0% |
| F | 32.0-58.0% |
| O | 1.0-18.0% |
| Mg | 0.3-8.0% |
| Y | 0.01-8.0% and |
| La | 0-5.0% and/or |
| Gd | 0-5.0% and/or |
| Li | 0-3.0% and/or |
| Na | 0-3.0% |
| K | 0-3.0% | wherein (Si+B+P+Al)/F is within a range from 0.18 to 0.37 and Ba/Sr is within a range from 0.6 to 1.0.

An optical glass having a refractive index (nd) within a range from 1.42 to 1.46 and an Abbe number (vd) within a range from 92 to 98 is a very useful material for industrial application since, in the optical design of a compact design having a small chromatic aberration can be realized by combining this optical glass with a high refractive index and high dispersion glass which is commercially available easily.

In Aspect 3, the type of component and composition range of respective components of the glass of Aspect 2 are limited to further preferable ranges for producing the glass having this refractive index and dispersion on a stable basis. Description about components which have been already described in Aspects 1 and 2 will be omitted in the following description of Aspect 3, La and Gd have the same effects as Y as trivalent glass modifying components and may be optionally added. If these components are added excessively, refractive index tends to increase excessively and, therefore, the upper limit of the amount of each of these components should preferably be 5.0%, more preferably be 4.0% and, most preferably be 3.0%.

Li, Na and K are monovalent glass modifying components which are effective for improving resistance to devitrification by increasing the glass composing components and may be optionally added. A monovalent glass modifying component, however, tends to produce ionic bond crystals when it is combined with F which constitutes the glass framework and, therefore, the upper limit of the amount of each of these components should preferably be 3.0%, more preferably be 2.5% and, most preferably be 2.0%.

By maintaining the ratio (Si+B+P+Al)/F within a desirable range and the ratio Ba/Sr in mass % on element basis within a range from 0.6 to 1.0, resistance to devitrification is further improved. If the ratio Ba/Sr is too small, relative ratio of Ba which promotes improvement in resistance to devitrification becomes small with resulting deterioration in resistance to devitrification. Therefore, the lower limit of this ratio should preferably be 0.6, more preferably be 0.62 and, most preferably be 0.65. On the other hand, this ratio is excessively large, refractive index exceeds a desired value and, therefore, the upper limit of this ratio should preferably be 1.0, more preferably be 0.98 and, most preferably be 0.95.

Sb may be added as an optional element for refining and homogenizing the optical glass of the present invention. This component may not be added at all. The upper limit of the amount of this component should preferably be 3%, more preferably be 2% and, most preferably be 1%.

Cl introduced from a chloride material, Br introduced from a bromide material and I introduced from an iodide material are effective for improving resistance to devitrification by introducing these components as components replacing a part of F. Moreover, by using a proper amount of these glass materials, glass forming reaction is enhanced and a defoaming effect also is obtained. For these reasons, these components may be added as optional components. For preventing deterioration in resistance to devitrification, the upper limit of the amount of each of these components should preferably be 1.0%.

Preferable glass materials for obtaining the glasses of Aspects 1 to 3 will be described later but the glass materials are not limited to those described in the present specification.

Transition metal elements such as V, Cr, Mn, Fe, Co, Ni, Cu, Ag and Mo excluding Ti are coloring agents of glass even when a small amount of these elements are included in the glass singly or in combination. Since these elements cause absorption in specific wavelengths in the visible region, it is preferable that these elements should not be included substantially in an optical glass which uses wavelengths in the visible region.

It is a recent tendency to refrain from using Pb, Th, Cd, Tl, As, Os, Be and Se as harmful chemical substance and, if these elements are used, steps for environmental protection must be taken not only in manufacturing of glass but also in processing of glass and disposal of glass products. It is preferable not to use these elements if environmental influence is considered.

The optical glasses of Aspects 4 to 6 will now be described. In the optical glasses of Aspects 4 to 6, amounts of respective components contained in materials before melting are expressed in mass % on element basis.

Aspect 4 defines elements concerning glass materials and glass components for stably producing an optical glass having a refractive index (nd) within a range from 1.41 to 1.47 and Abbe number (vd) within a range from 90 to 100. The roles and effects of the respective components are the same as those described with respect to Aspects 1 to 3 and description of these components will be omitted. Aspect 5 represents more preferable embodiment of Aspect 4 and Aspect 6 represents a more preferable embodiment of Aspect 5.

When glass is produced by a melting method, a glass material composition forms a glass melt through glass forming reaction which is a kind of chemical reaction. For enabling the glass forming reaction to proceed smoothly, it is important to pay attention to forms and combination of glass materials.

Oxide materials generally have a high melting point and therefore there is tendency that glass material remains to the last stage in the glass forming reaction of the glass material composition as a whole and, as a result, there is a case where the oxide material remains unmelted if the glass forming reaction temperature, i.e., melting temperature of the glass material is too low. For preventing occurrence of such material remaining unmelted, it is considered to elevate the melting temperature of the glass material or prolong the melting time. In the low refractive index and low dispersion glass of the present invention, however, this method is not preferable because the glass must contain a large amount of F which has high volatility. For this reason, use of an oxide material in a large amount is not desirable.

Since a complex phosphate is a source of P which is an essential component in the glass of the present invention, it is used essentially as a glass material. A complex phosphate has a lower melting point than an oxide material and therefore the glass forming reaction tends to proceed in a low temperature. Hence a complex phosphate may be preferably used as a glass material for obtaining the glass of the present invention. Since an oxide material and/or a phosphoric acid compound are source of O which is an essential component of the glass of the present invention, they must be used as glass materials. It should however be considered that excessive use of such materials introduces an amount of O which is more than necessary. It is possible to use general glass materials such as a carbonic acid compound, nitric acid compound, sulfuric acid compound and hydroxide as a source of O. These materials, however, are decomposed in the glass forming reaction to discharge a gas (e.g., carbonic acid gas in the case of a carbonic acid compound). Therefore, if such materials are used excessively, the glass melt tends to be foamed and thereby is caused to overflow from a melting crucible or, evaporation of F component in the glass melt is enhanced when the discharged gas which has become foams rises to the surface of the melt and is dispersed in the air from the surface of the melt. Therefore, it is preferable to limit use of such compound materials to only a small amount (less than 5.0 mass % of the total mass of the glass materials) if such compound materials are used.

A fluoride material is used as an essential glass material since it is a source of F which is an essential component of the glass of the present invention.

Aspect 5 is a more preferable embodiment of Aspect 4 and Aspect 6 is a more preferable embodiment of Aspect 5. The roles and effects of the glass components introduced from the glass materials described in Aspects 5 and 6 are the same as those described in Aspects 1-3.

Al, Mg, Ca, Sr and Ba should preferably be introduced from a complex phosphate and/or fluoride as essential sources. Preferable complex phosphate for introducing Al include $Al(PO_3)_3$ and $AlPO_4$. A preferable fluoride for introducing Al is $AlF_3$. Preferable complex phosphates for introducing alkaline earth metal elements (R"=Mg, Ca, Sr, Ba) include $R"(PO_3)_2$ and $R"_2P_2O_7$. A preferable fluoride for introducing alkaline earth metal elements (R"=Mg, Ca, Sr, Ba) is $R"F_2$.

The upper limit of the amount of P contained in the raw material should preferably be 5.0%, more preferably be 4.8% and, most preferably be 4.5% and the lower limit of the amount of P contained in the raw material should preferably be 1.0%, more preferably be 1.1% and, most preferably be 1.2%.

The upper limit of the amount of Al contained in the raw material should preferably be 20.0%, more preferably be 19.0% and, most preferably be 18.0% and the lower limit of the amount of Al contained in the raw material should preferably be 1.0%, more preferably be 3.0% and, most preferably be 8.0%.

The upper limit of the amount of Mg contained in the raw material should preferably be 5.0%, more preferably be 4.0% and, most preferably be 3.0%. Mg may not be added but this component should preferably be added in an amount of 0.3% or over.

The upper limit of the amount of Ca contained in the raw material should preferably be 20.0%, more preferably be less than 17.5% and, most preferably be 12.0% and the lower limit of the amount of Ca contained in the raw material should preferably be 1.0%, more preferably be 3.0% and, most preferably be 7.0%.

The upper limit of the amount of Sr contained in the raw material should preferably be 20.0%, more preferably be 19.0% and, most preferably be 18.0% and the lower limit of the amount of Sr contained in the raw material should preferably be 1.0%, more preferably be 8.0% and, most preferably be 12.0%.

The upper limit of the amount of Ba contained in the raw material should preferably be 20.0%, more preferably be 18.0% and, most preferably be 15.0% and the lower limit of the amount of Ba contained in the raw material should preferably be 1.0%, more preferably be 3.0% and, most preferably be 5.0%.

The sum of Sr and Ba should preferably be within a range from 20.0% to 35.0% and, more preferably be within a range from 22.0% to 33.0%.

The lower limit of the ratio Ba/Sr should preferably be 0.6, more preferably be 0.62 and, most preferably be 0.65 and the upper limit of this ratio should preferably be 1.0, more preferably be 0.98 and, most preferably be 0.95.

The element components Y, La and Gd should preferably be introduced from a fluoride material. It is also possible to introduce these components from a complex phosphate (e.g. metacomplex phosphate compound) but such compound is hard to obtain and are expensive, it is preferable to introduce these element components from fluorides ($YF_3$, $LaF_3$ and $GdF_3$) if the glass of the present invention should be obtained stably and economically.

The upper limit of the amount of Y contained in the raw material should preferably be 8.0%, more preferably be 6.0% and, most preferably be less than 4.0% and the lower limit of the amount of Y contained in the raw material should preferably be 0.01%, more preferably be 0.5% and, most preferably be 1.0%.

The upper limit of the amount of La contained in the raw material should preferably be 5.0%, more preferably be 4.0% and, most preferably be 3.0%. La may not be added at all.

The upper limit of the amount of Gd contained in the raw material should preferably be 5.0%, more preferably be 4.0% and, most preferably be 3.0%. Gd may not be added at all.

Since F which is essential for the present invention is supplied to the glass in a large quantity, the alkali metal elements (R=Li, Na, K) should preferably be introduced from a fluoride material as an essential material. In fluorides, a fluoride in the form of RF has a strong ionic bond and thereby hampers smooth proceeding of the glass forming reaction. Therefore, it is preferable to use combined fluorides such as $R_2SiF_6$ and $R_3AlF_6$ for introducing the alkali metal components. When the alkali metal components are introduced from phosphoric acid compounds such as $RPO_3$, $R_3PO_4$ and $R_2HPO_4$ (including their hydrates) consideration must be made so that the amounts of P and O introduced from such materials should be maintained within predetermined ranges.

The upper limit of the amount of Li contained in the raw material should preferably be 3.0%, more preferably be 2.0% and, most preferably be 1.0%. Li may not be added at all.

The upper limit of the amount of Na contained in the raw material should preferably be 3.0%, more preferably be 2.0% and, most preferably be 1.0%. Na may not be added at all.

The upper limit of the amount of K contained in the raw material should preferably be 3.0%, more preferably be 2.0% and, most preferably be 1.0%. K may not be added at all.

The upper limit of the amount of F contained in the raw material should preferably be 65%, more preferably be 55% and, most preferably be 50%. The lower limit of the amount of F contained in the raw material should preferably be 35%, more preferably be 40% and, most preferably be 42%.

Cl introduced from a chloride material, Br introduced from a bromide material and I introduced from an iodide material are effective for improving resistance to devitrification by introducing these components as components replacing a part of F. Moreover by using a proper amount of these glass materials, glass forming reaction is enhanced and a defoaming effect also is obtained. These components may therefore be added as optional components. If, however, Cl is introduced from a chloride material in the glass in an amount exceeding 3.0%, and Br introduced from a bromide material and I introduced from an iodide material in an amount exceeding 5.0% respectively, these elements having a large ionic radius are introduced in a large amount in the glass with resulting instability of the glass and deterioration in resistance to devitrification. More preferable upper limit of each of these elements, therefore, is 1.0% These elements may not be added at all.

The upper limit of the amount of O contained in the raw material should preferably be 10.0%, and more preferably be 8.0% and the lower limit of the amount of O contained in the raw material should preferably be 0.1%, and more preferably be 0.5%.

By adjusting the ratio (Si+B+P+O)/F in mass % on element basis in the glass material composition (i.e., materials before melting) to 0.20-0.40, it becomes easy to obtain the glasses of Aspects 1-3. If this ratio is too small, an excessive amount of F tends to be introduced into the glass and, as a result, viscosity of the glass melt is reduced and forming of a glass product thereby becomes difficult. Besides, resistance to devitrification is deteriorated and, as a result, productivity is decreased. On the other hand, if this ratio is excessively large, the amount of F in the glass framework is relatively reduced due to evaporation of F during the glass forming reaction and melting of the glass and, as a result, resistance to devitrification is deteriorated and it becomes difficult to achieve desired optical constants (particularly low dispersion property). For this reason, the upper limit of this ratio should preferably be 0.40, more preferably be 0.35 and, most preferably be 0.30 and the lower limit of this ratio should preferably be 0.20, more preferably be 0.25 and, most preferably be 0.27.

A material form which can be obtained most cheaply and easily for introducing Si is an oxide (typically $SiO_2$) but, in the present invention, as described above, it is preferable to introduce Si from glass materials other than oxides e.g., $R_2SiF_6$ (R=Li, Na, K). The upper limit of Si contained in the raw material should preferably be less than 0.2%, more preferably be 0.195% and, most preferably be 0.19%.

$B_2O_3$ which is an oxide of B is an instable compound having a high humidity absorbing property and a great care must be taken for this compound. Thus, since this compound hampers a stable production, it is desirable to use a glass material other than an oxide for introducing B in the glass. Use of a hydrate of $B_2O_3$ such as $H_3BO_3$ as a material is not desirable either because it produces water ($H_2O$) during the glass forming reaction and thereby enhances evaporation of F. It is therefore preferable to introduce F in the form of $BPO_4$ or $LiBF_4$. The upper limit of B contained in the raw material should preferably be less than 0.5%, more preferably be 0.25% and, most preferably be 0.20%.

The upper limit of Sb should preferably be 3%, more preferably be 2% and, most preferably be 1%.

By adjusting the glass material composition in mass % on element basis so that it will be within the range defined in Aspects 5 and 6, the low refractive index and low dispersion glasses described in Aspects 1-4 can be obtained stably by using a general melting method.

Aspects 7-9 will now be described. In Aspects 7-9, amounts of the respective components contained in materials before melting are expressed in mass % for each compound.

Aspects 7 and 8 show material compositions which are suitable for obtaining a glass having a refractive index (nd) within a range from 1.41 to 1.47 and an Abbe number (vd) within a range from 90 to 100. In the description of Aspects 7 and 8, "mass % on the basis of the total mass of the glass material" is expressed simply as "%".

$Al(PO_3)_3$ is a useful material for introducing Al, P and O in the glass and is effective for enhancing forming of a stable glass and improving mechanical strength and chemical durability of the glass. If the amount of this material is too small, these effects cannot be achieved sufficiently. The lower limit of the amount of this material should preferably be 2.0%, more preferably be 2.5% and, most preferably be 3.0%. On the other hand, if this material is used excessively, refractive index and dispersion of the glass increase whereby it becomes difficult to achieve desired optical constants. The upper limit of the amount of this material therefore should be 10.0%, more preferably be 9.5% and, most preferably be 9.0%.

$AlF_3$ is a useful material for introducing Al and F in the glass and is effective for enhancing the glass forming reaction and forming of a stable glass and reducing refractive index and dispersion of the glass. If the amount of this material is too small, desired optical constants cannot be achieved sufficiently. The lower limit of the amount of this material should preferably be 20%, more preferably be 22% and, most preferably be 25%. On the other hand, if this material is used excessively, resistance to devitrification is deteriorated. The upper limit of the amount of this material therefore should be 35%, more preferably be 33% and, most preferably be 30%.

$CaF_2$ is a useful material for introducing Ca and F in the glass and is effective for reducing dispersion and specific gravity of the glass and enhancing forming of a stable glass. If the amount of this material is too small, these effects cannot be achieved sufficiently. The lower limit of the amount of this material should preferably be 15%, more preferably be 16% and, most preferably be 18%. On the other hand, if this material is used excessively, resistance to devitrification is deteriorated. The upper limit of the amount of this material therefore should be 25%, more preferably be 24% and, most preferably be 22%.

$SrF_2$ is a useful material for introducing Sr and F in the glass and is effective for adjusting refractive index of the glass and enhancing forming of a stable glass. If the amount of this material is too small, these effects cannot be achieved sufficiently. The lower limit of the amount of this material should preferably be 15%, more preferably be 15.5% and, most preferably be 16%. On the other hand, if this material is used excessively, desired optical constants cannot be achieved sufficiently and resistance to devitrification is deteriorated. The upper limit of the amount of this material therefore should be 28%, more preferably be 27% and, most preferably be 25%.

$BaF_2$ is a useful material for introducing Ba and F in the glass and is effective for adjusting refractive index of the glass and enhancing forming of a stable glass. If the amount of this material is too small, these effects cannot be achieved sufficiently. The lower limit of the amount of this material should preferably be 5%, more preferably be 6% and, most preferably be 8%. On the other hand, if this material is used excessively, refractive index of the glass increases excessively, specific gravity of the glass increases and chemical durability of the glass is deteriorated. The upper limit of the amount of this material therefore should be 20%, more preferably be 18% and, most preferably be 15%.

$YF_3$ is a useful material for introducing Y and F in the glass and is effective for adjusting refractive index of the glass and enhancing forming of a stable glass. If the amount of this material is too small, these effects cannot be achieved sufficiently. The lower limit of the amount of this material should preferably be 0.1%, more preferably be 0.5% and, most preferably be 1.0%. On the other hand, if this material is used, refractive index of the glass increases excessively. The upper limit of the amount of this material therefore should be 10%, more preferably be 9% and, most preferably be 8%.

Aspect 9 specifically show preferable raw materials in Aspects 7 and 8. In the description of Aspect 9, "mass % on the basis of the total mass of glass materials" is simply expressed as "%" and description of the components which have already been described in Aspects 7 and 8 will be omitted.

$MgF_2$ is a useful material for introducing Mg and F in the glass and is effective for adjusting refractive index of the glass and improving chemical durability of the glass. If the amount of this material is too small, the effect of improving chemical durability cannot be achieved sufficiently. The lower limit of the amount of this material should preferably be 1%, more preferably be 1.5% and, most preferably be 2%. On the other hand, if this material is used excessively, resistance to devitrification is deteriorated. The upper limit of the amount of this material therefore should be 7%, more preferably be 6.5% and, most preferably be 6%.

By adjusting the ratio in mass % $(MgF_2+CaF_2)/(Al(PO_3)_3+AlF_3)$ to less than 0.77, further improvement in resistance to devitrification can be achieved. $MgF_2$ and $CaF_2$ which constitute the numerator of this ratio are components which will deteriorate resistance to devitrification when they are added in a large amount whereas $Al(PO_3)_3$ and $AlF_3$ which constitute the denominator of this ratio are components which enhance improvement in resistance to devitrification. Therefore, the smaller this ratio is, the more excellent is resistance to devitrification of the glass obtained. The upper limit of this ratio in mass % should preferably be less than 0.77, more preferably be less than 0.73 and, most preferably be 0.72. If, however, this ratio in mass % is too small, it becomes difficult to achieve desired optical constants. The lower limit of this ratio should preferably be 0.5, more preferably be 0.51 and, most preferably be 0.52.

The effect of improving resistance to devitrification can be achieved more easily by adjusting the ratio $(Si+B+P+Al)/F$ to a predetermined range and adjusting the ratio Ba/Sr in mass % on element basis to a predetermined range. These ranges are the same as those which have been described in Aspects 4-6.

Description will now be made about Aspect 10.

Si and B contained in a glass material are preferable components for preventing occurrence of devitrification (precipitation of crystals) in the inside of the glass during cooling of the glass from the molten state As described above, a large amount of F must be added in the glass for realizing the low refractive index and low dispersion properties and bond between molecules in such glass tends to be ionic bond rather than covalent bond. With the components and composition ratio of the glass, the glass tends to change to an ionic bond type crystals which are thermodynamically stable during cooling of the glass melt rather than maintaining a glass state. In such a case, it involves great difficulty to improve resistance to devitrification while realizing desired low refractive index and low dispersion property by simply adjusting glass components. The above described essential components except for P and Al are elements which have a relatively large ionic radius. It has been found that, by introducing a small amount of Si and/or B having a relatively small ionic radius in the glass, it becomes possible to effectively prevent change from the glass state to the crystalline state without substantially altering the glass structure made by the main components. For achieving this effect sufficiently, the lower limit of the total amount of Si and/or B in the glass material composition should preferably be 0.005%, more preferably be 0.008% and, most preferably be 0.01%. On the other hand, if an excessively large amount of Si and/or B is contained in the glass material composition, Si and/or B in which covalent bond is strong tends to precipitate covalent bond type crystals in the glass and, besides, it becomes difficult to achieve the low refractive and low dispersion properties. Therefore, the upper limit of the total amount of Si and/or B should preferably be less than 0.2%, more preferably be 0.195% and, most preferably be 0.19%.

The amount of introduction of Si and/or B is expressed as an amount contained in the glass material composition. Si and/or B are introduced for preventing occurrence of devitrification during cooling from the glass melt. When glass is produced by a commonly adopted melting method, various glass materials are weighed, adjusted and mixed and these materials are put in a melting furnace of a hot temperature to produce the glass forming reaction and, after refining, stirring and homogenizing a glass melt, the glass melt is cooled to solidify. Since glass materials can be selected in various manner from oxides, carbonates, nitrates, sulfates, complex phosphates, halogenide and hydroxides etc. of desired glass component elements and glass forming reaction of these materials are complicated and can be combined in an innumerable manner, these materials cannot be simply determined and, besides, coordination number, ionic radius and valency of ion cannot be determined simply. Therefore, the amounts of Si and B are expressed in the form of elements in this specification.

Aspect 11 refers to raw materials for producing the glass of Aspects 1-10 stably and economically.

Since $SiO_2$ and $B_2O_3$ are oxides, they are materials which tend to hinder smooth glass forming reaction as described above. Therefore, in case Si and/or B is introduced in the glass, it should preferably be introduced from a material other than an oxide, e.g., a fluoride or complex phosphate. Use of a hydrate of $B_2O_3$ such as $H_3BO_3$ as a material is not preferable because water ($H_2O$) is produced in the glass forming reaction and this water enhances evaporation of F.

$Ba(PO_3)_2$ and $BaCl_2$ are materials which tend to make an alloy with a platinum group element such as Pt which is used as a material of a common glass melting equipment particularly in the glass forming reaction. Ba tends to form an alloy particularly with Pt among the platinum group ions and, when a phosphoric acid compound is used as a glass material, it tends to cause damage to a melting equipment. For obtaining the glass of the present invention stably without causing damage to the melting equipment, this material should preferably not be used. Further, Cl introduced from $BaCl_2$ tends to injure Pt in the melting equipment and thereby cause a large amount of Pt ion to solve out into the glass and, as result, absorption of Pt ion occurs particularly in the short wavelength region of 450 nm or below with resulting deterioration in transmittance of the glass. For this reason, use of this material is not preferable.

Materials of LiF, NaF and KF have a strong ionic bond of R—F and thereby hinders smooth glass forming reaction and, besides, in the glass forming reaction, cause Pt of the melting equipment to ionize and solve out into the glass in a large amount. As a result, absorption of Pt ion occurs in the short wavelength region of 450 nm or below with resulting deterioration in transmittance of the glass. Therefore, use of these materials is not preferable.

Materials of $LiPF_6$, $NaPF_6$ and $KPF_6$ cause, in the glass forming reaction, Pt of the melting equipment to ionize and solve out into the glass in a large amount. As a result, absorption of Pt ion occurs in the short wavelength region of 450 nm or below with resulting deterioration in transmittance of the glass. Therefore, use of these materials is not preferable. In addition, these alkali metal compounds are materials which are not readily obtainable commercially and therefore are expensive. In the present invention, it is preferable not to use these materials for obtaining the glass of the present invention economically.

Aspect 12 shows the most specific embodiment for obtaining the glass of the present invention stably and economically. Description of the components which have already been described will be omitted.

$Na_2SiF_6$ is a useful material which can introduce Na, Si and F in the glass. $K_2SiF_6$ is also a useful material which can introduce K, Si and F in the glass. These materials can be added optionally. If each of these materials is added in an amount exceeding 3.0%, an excessive amount of F is introduced in the glass and, as a result, resistance to devitrification of the glass is deteriorated and chemical durability of the glass is also deteriorated by excessive introduction of Na and K. Therefore, the upper limit of each of these materials should preferably be 3.0%, more preferably be 2.8% and, most preferably be 2.5%.

For introducing Si which has, as described above, the effect of improving resistance to devitrification in the glass by addition of a small amount of this component, either one of these materials may be used or both of these materials may be used. The lower limit of a sum of these materials ($Na_2SiF_6+K_2SiF_6$) should preferably be 0.01%, more preferably be 0.03% and, most preferably be 0.05%. On the other hand, if the sum of these materials exceeds 5.0%, an excessive amount of F is introduced in the glass and, as a result, resistance to devitrification of the glass is deteriorated and chemical durability of the glass is also deteriorated by excessive introduction of Na and K. Therefore, the upper limit of the sum of these materials should preferably be 5.0%, more preferably be 4.0% and, most preferably be 3.0%.

$KHF_2$ is a useful glass material because it can produce an effect of defoaming a glass melt and also an effect of an acidifying agent for directing the glass melt which has a strong reducing tendency in a neutral direction. When the reducing tendency in the glass melt becomes strong, Ba and P in the glass react with the melting equipment made by the platinum group metal and thereby cause Pt ion to solve out into the glass and, in the worst case, cause an alloy to be produced with the platinum group metal with the result that glass flows out of the alloy portion. If the amount of this material is too small, these effects cannot be achieved sufficiently and, therefore, the lower limit of this material should preferably be 0.1%, more preferably be 0.13% and, most preferably be 0.15%. On the other hand, if this glass material is excessively used, discharged HF gas increases and thereby increases the amount of evaporation of F in the glass. Therefore, the upper limit of the amount of this material should preferably be 3.0%, more preferably be 2.8% and, most preferably be 2.5%.

$NH_4F.HF$, like $KHF_2$, can produce an effect of defoaming a glass melt and also an effect of an acidifying agent for directing the glass melt which has a strong reducing tendency in a neutral direction and can be used optionally. Since, however, an amount of introduction of HF gas is larger than $KHF_2$, the upper limit of the amount of this material should preferably be 1.0%, more preferably be 0.99% and, most preferably be 0.98%.

Aspect 13 shows a preferable embodiment of the glass of Aspect 12, which comprises $Na_2SiF_6$ in an amount within a range from 0 to 3% and $K_2SiF_6$ in an amount within a range from 0 to 3%. In Aspect 13, the sum ($Na_2SiF_6+K_2SiF_6$) is within a range from 0.03% to 4.0%.

Aspect 14 shows an embodiment of Aspects 1-13 which is characterized by that the glass has a strong resistance to devitrification during cooling of the glass melt.

In a case where glass is obtained by a continuous melting and forming method which has a high productivity, the glass melt is held at a low temperature and a glass is formed in a high viscosity state of the glass melt, for preventing occurrence of a striped ununiform portion (striae) caused by a convection current of flowing glass. When a glass melt with a glass composition having poor resistance to devitrification is held at a low temperature, crystals precipitate in the glass melt. Precipitation of crystals in the glass melt is influenced not only by a temperature factor but also by a time factor. If the glass melt is held at a low temperature for a long period of time, crystals precipitate from the glass melt due to the time factor. If glass is continuously formed over a long period of time (at least several days) from such glass melt, crystals precipitate in the melting equipment and, as a result, crystals are mixed in a solidified glass obtained and a homogeneous glass cannot be obtained, or crystals remain in the melting equipment and have an adverse influence over flowing glass and thereby producing an ununiform portion (striae) in obtained glass. When there is likelihood of such phenomenon, glass cannot be produced stably by the continuous melting and forming method having a high productivity and, therefore, a production method having an inferior productivity must be used. This is apparently uneconomical.

Temperature of 1000° C. is a temperature which is sufficiently higher than a temperature at which crystals precipitate from a glass melt and 690° C. at which the glass is held for 60 hours is a temperature which is near to the glass forming temperature of the glasses of Aspects 1-13. If it is confirmed by this evaluation method that crystals do not precipitate in the inside of the glass, the highly economical continuous melting and forming production system can be applied and glass can be produced in a stable manner.

Aspect 15 shows evaluation of devitrification property of glass by differential thermal analysis (DTA). Glass has no melting point and yet crystals precipitate (i.e., devitrification occurs) when elevated temperature exceeds a certain point and, as the temperature is further elevated, the precipitated crystals (devitrification) are melted. This devitrification disappearing temperature is expressed as Tm. Tm is detected as a heat absorption peak in DTA curve. On the other hand, if the glass melt is cooled after the crystals (devitrification) have sufficiently been melted, generation of heat caused by precipitation of crystals (occurrence of devitrification) is observed in the DTA curve. This crystal precipitation (devitrification) starting temperature is expressed as Tx.

As the value of (Tm−Tx) increases, it means that precipitation of crystals (occurrence of devitrification) during cooling of the glass melt becomes more difficult. By setting this value to 15° C. or over, precipitation of crystals hardly takes place even if the temperature of the glass is lowered to a low temperature. Therefore, viscosity of the glass during glass forming can be increased whereby occurrence of a striped ununiform portion (striae) caused by a convection current in the flowing glass can be effectively prevented. The value of (Tm−Tx) should more preferably be 16° C. or over and, most preferably be 17° C. or over.

Aspect 16 is characterized in that acid-proof property of the glass measured in accordance with JOGIS 06[1999] "Method for Measuring Chemical Durability of Optical Glass (Powder Method)" is Class 1 to Class 3.

When glass is processed to a lens or prism, the glass is exposed to water, a polishing agent and a rinsing agent. If glass made of a material which has poor acid-proof property is used for producing a lens or prism, glass material tends to solve out resulting in an insufficient finish of a polished surface. In such a case, for obtaining a clean and smooth polished surface, much efforts must be made and this is not economical. For this reason, the acid-proof property should preferably be Class 3 or better than that.

As described in Aspects 17-19, the glasses described in Aspects 1-16 are useful as materials for producing optical elements including lenses and prisms and, by using these optical elements for cameras and projectors, a high precision chromatic aberration can be realized.

As a typical example of a method for producing lenses and prisms by using glass as a material, reheat pressing is described in Aspect 18. The invention, however, is not limited to reheat pressing but optical elements may be produced by using other method such, for example, as mold pressing.

EXAMPLES

Examples of the optical glass of the present invention will be described below. It should be understood that the scope of the present invention is in no way restricted to these examples.

Tables 1 to 4 show amounts in mass % on element basis of elements constituting glass materials (Aspects 4-6), the ratio (Si+B+P+Al)/F in mass % on element basis, the ratio Ba/Sr, refractive index (nd), Abbe number (vd), and a result of a constant temperature test (Tm−Tx) of Example Nos. 1-23 for obtaining a ultra-low refractive index and ultra-low dispersion fluoro-complex phosphate glass having a refractive index (nd) within a range from 1.41 to 1.47 and an Abbe number (vd) within a range from 90 to 100. Tables 5 to 8 show amounts in mass % of glass materials (Aspects 7-9), the ratio ($MgF_2+CaF_2$)/($Al(PO_3)_3+AlF_3$) in mass % of the respective examples. In other words, the examples of Tables 5 to 8 are of the same composition as the corresponding examples expressed in a different manner.

Table 9 shows glass compositions and properties of Comparative Examples No. A-E of the prior art optical glasses. In this Table, Comparative Example A is Example 6 of Japanese Patent Application Laid-open Publication No. 10-212133, Comparative Examples B and C are Examples 3 and 5 of Japanese Patent Application Laid-open Publication No. 63-14141 and Comparative Examples D and E are Examples 2 and 7 of Japanese Patent Application Laid-open Publication No. 6-1919876. The values of refractive index (nd) and Abbe number (vd) in the Table are those described in these publications. As to these comparative examples, the description in the publications was interpreted to mean glass material composition. As to Comparative Example A, the mol % expression was changed to the mass % expression. The glass materials were melted according to the process described in these publications to obtain glasses.

The refractive index (nd), Abbe number (vd), result of the temperature holding test, difference between devitrification disappearing temperature (Tm) and devitrification starting temperature (Tx) measured in accordance with DTA and acid-proof property measured in accordance with the powder method of the obtained glasses were measured in the following manner.

(1) Refractive Index (nd) and Abbe Number (vd)

Refractive index (nd) and Abbe number (vd) were measured on glass provided by setting the falling temperature speed during cooling of the melt to −25° C./hour.

(2) Evaluation of the Constant Temperature Test

The obtained glass was crushed to pieces having a length of about 5 mm and was put in a platinum crucible having a capacity of 50 cc. A lid made of alumina was put on this crucible and the crucible was placed in an electric furnace of 1000° C. and this temperature was held for one hour. Then, the temperature of the electric furnace was lowered at a rate of about 100° C./hour (i.e., taking about three hours from 1000° C. to 690° C.) and the temperature of 690° C. of the electric furnace in which the crucible was kept was held for 60 hours. Then the platinum crucible was taken out of the electric furnace and the lid was removed. The inside of the glass was observed with eye under a bright light and glass in which devitrification (precipitation of crystals) was not observed was expressed by the mark ○ and glass in which devitrification was observed was expressed by the mark X.

(3) Difference (Tm−Tx) Between the Devitrification Disappearing Temperature Tm (° C.) and the Devitrification Starting Temperature (Tx) (° C.)

The obtained glass was crushed to pieces having a particle size of 425 μm to 600 μm and about 200 mg of the crushed glass specimen was put in a DTA crucible made of alumina and the DTA crucible was heated to 800° C. at a temperature elevating speed of 10° C./minute. In heat absorption peaks of the differential thermal curve detected during this heat elevating process, the heat absorption peak of the highest temperature was used as the devitrification disappearing temperature Tm. As to Tm, there was little dependency upon difference in the elevating temperature speed and, therefore, measurement was made only about the above described temperature elevating speed. After reaching 800° C., the temperature was lowered to 300° C. at a temperature falling speed of 5° C./minute and also at a temperature falling speed of 10° C./minute. The heat generation starting temperature Tx(−5) at the highest temperature in the differential thermal curve detected in the course of cooling at the temperature falling speed of 5° C./minute and the heat generation starting temperature Tx(−10) at the highest temperature in the differential thermal curve detected in the course of cooling at the temperature falling speed of 10° C./minute were measured twice respectively. A temperature obtained by extrapolating these measured values to a temperature falling speed of 0° C./minute was defined as the devitrification starting temperature (Tx) (° C.) and the difference (Tm−Tx) (° C.) was calculated. The result is shown in Table 11. For better understanding, FIG. 1 shows Tm of Example 1 and Comparative D by dotted lines.

(4) Powder Method Acid-Proof Property

The acid-proof property (Class) was measured in accordance with Japan Optical Industrial Standard "Method for Measuring Chemical Durability of Optical Glass (Powder Method)" JOGIS 06[1999]. Specifically, the obtained glass was crushed to pieces having a particle size of 425 μm to 600 μm and specific gravity gram of the crushed glass specimen was put in a platinum basket. This platinum basket was placed in a round bottom flask made of quartz containing 10 mmol/l (=0.01N) nitric acid aqueous solution and treated in a boiled water bath for 60 minutes. Reduction rate of the glass specimen after this treatment was calculated. A case where the reduction rate was less than 0.20% was ranked as Class 1, a case where the reduction rate was 0.20%-less than 0.35% was ranked as Class 2 and a case where the reduction rate was 0.35% to less than 0.65% was ranked as Class 3. This Class means that the smaller the Class, the more excellent is the acid-proof property of the glass.

For producing the glasses of the examples of the present invention described in Tables 1-8, ordinary raw materials for optical glasses described above were weighed and mixed at a predetermined ratio and mixed materials were put in a platinum crucible and a lid made of a refractory material such as platinum or alumina was placed on the crucible. The materials were melted at a temperature within a temperature range from 900° C. to 1050° C. for three to four hours in an electric furnace depending upon melting property of the glass components. The melt was stirred and thereby homogenized and, after the temperature was lowered to 680° C. in two to three hours in the electric furnace, the melt was cast into a mold and annealed to produce the glasses.

TABLE 1

| element mass % | 1 | 2 | 3 | 4 | 5 | 6 |
|---|---|---|---|---|---|---|
| Si |  | 0.047 | 0.025 | 0.046 |  |  |
| B |  |  |  |  |  |  |
| Al | 9.442 | 9.468 | 9.902 | 9.778 | 9.349 | 9.814 |
| P | 2.364 | 2.370 | 2.759 | 2.530 | 2.317 | 2.539 |
| Y | 3.039 | 2.438 |  | 3.028 | 3.039 | 3.039 |
| La |  |  | 1.205 |  |  |  |
| Gd |  | 0.760 | 1.521 |  |  |  |
| Mg | 1.576 | 1.580 | 1.775 | 1.570 | 1.576 | 1.576 |
| Ca | 10.341 | 10.370 | 10.626 | 10.303 | 10.341 | 10.853 |
| Sr | 16.173 | 15.772 | 13.776 | 14.382 | 16.173 | 14.434 |
| Ba | 10.108 | 10.136 | 11.593 | 10.850 | 10.405 | 10.108 |
| Li |  |  |  |  |  |  |
| Na |  |  |  |  |  |  |
| K | 0.335 | 0.341 | 0.071 | 0.464 | 0.335 | 0.335 |
| Sb |  |  |  |  |  |  |
| F | 42.919 | 42.928 | 42.428 | 43.088 | 42.833 | 43.326 |
| O | 3.663 | 3.674 | 4.275 | 3.921 | 3.592 | 3.936 |

TABLE 1-continued

| element mass % | 1 | 2 | 3 | 4 | 5 | 6 |
|---|---|---|---|---|---|---|
| H | 0.016 | 0.030 | 0.010 | 0.016 | 0.016 | 0.016 |
| N | 0.024 | 0.086 | 0.034 | 0.024 | 0.024 | 0.024 |
| Cl | | | | | | |
| Br | | | | | | |
| I | | | | | | |
| Total | 100.000 | 100.000 | 100.000 | 100.000 | 100.000 | 100.000 |
| (Si + B + P + Al)/F | 0.275 | 0.277 | 0.299 | 0.287 | 0.272 | 0.285 |
| Ba/Sr | 0.625 | 0.643 | 0.842 | 0.754 | 0.643 | 0.700 |
| Nd | 1.4389 | 1.4400 | 1.4352 | 1.4388 | 1.4388 | 1.4376 |
| νd | 95.0 | 96.4 | 93.8 | 95.0 | 95.0 | 95.3 |
| Constant temperature test | ○ | ○ | ○ | ○ | ○ | ○ |
| Tm − Tx[° C.] | 18 | | | 37 | 20 | |

TABLE 2

| element mass % | 7 | 8 | 9 | 10 | 11 | 12 |
|---|---|---|---|---|---|---|
| Si | 0.046 | 0.046 | | 0.046 | 0.051 | |
| B | | | | | | |
| Al | 9.829 | 9.778 | 9.343 | 9.829 | 9.660 | 9.961 |
| P | 2.705 | 2.530 | 2.623 | 2.705 | 2.570 | 2.715 |
| Y | 2.725 | 2.422 | 3.042 | 3.028 | 2.743 | 3.039 |
| La | | | | | | |
| Gd | | | | | | |
| Mg | 1.570 | 1.570 | 1.577 | 1.570 | 1.557 | 1.576 |
| Ca | 10.813 | 10.813 | 10.351 | 11.323 | 10.754 | 10.341 |
| Sr | 14.382 | 14.382 | 16.189 | 12.996 | 13.950 | 15.269 |
| Ba | 10.071 | 10.850 | 9.993 | 10.461 | 10.919 | 9.327 |
| Li | | | | | | |
| Na | | | | | | |
| K | 0.464 | 0.464 | 0.336 | 0.464 | 0.611 | 0.335 |
| Sb | | | | | | |
| F | 43.163 | 43.184 | 42.471 | 43.346 | 42.892 | 43.189 |
| O | 4.192 | 3.921 | 4.066 | 4.192 | 3.983 | 4.208 |
| H | 0.016 | 0.016 | 0.009 | 0.016 | 0.016 | 0.016 |
| N | 0.024 | 0.024 | | 0.024 | 0.025 | 0.024 |
| Cl | | | | | | |
| Br | | | | | 0.269 | |
| I | | | | | | |
| total | 100.000 | 100.000 | 100.000 | 100.000 | 100.000 | 100.000 |
| (Si + B + P + Al)/F | 0.291 | 0.286 | 0.282 | 0.290 | 0.286 | 0.294 |
| Ba/Sr | 0.700 | 0.754 | 0.617 | 0.805 | 0.783 | 0.611 |
| Nd | 1.4381 | 1.4378 | 1.4407 | 1.4385 | 1.4388 | 1.4397 |
| νd | 94.2 | 94.6 | 93.5 | 94.3 | 95.0 | 94.3 |
| Constant temperature test | ○ | ○ | ○ | ○ | ○ | ○ |
| Tm − Tx[° C.] | | | | | | |

TABLE 3

| element mass % | 13 | 14 | 15 | 16 | 17 | 18 |
|---|---|---|---|---|---|---|
| Si | | 0.045 | | 0.111 | | 0.023 |
| B | | | 0.048 | | | |
| Al | 9.495 | 9.731 | 9.791 | 9.151 | 9.122 | 9.796 |
| P | 2.539 | 2.722 | 2.533 | 2.371 | 2.364 | 2.535 |
| Y | 3.039 | 2.743 | 3.032 | 3.049 | 3.039 | 3.033 |
| La | | | | | | |
| Gd | | | | | | |
| Mg | 1.574 | 1.580 | 1.572 | 1.230 | 1.576 | 1.573 |
| Ca | 10.853 | 10.883 | 10.317 | 10.374 | 10.341 | 10.322 |
| Sr | 15.130 | 13.951 | 14.401 | 16.225 | 16.173 | 14.408 |
| Ba | 10.108 | 10.684 | 10.864 | 10.141 | 10.108 | 10.869 |
| Li | | | | | | |

TABLE 3-continued

| element mass % | 13 | 14 | 15 | 16 | 17 | 18 |
|---|---|---|---|---|---|---|
| Na | | | | 0.049 | | |
| K | 0.335 | 0.355 | 0.335 | 0.761 | 0.835 | 0.400 |
| Sb | | | | | | |
| F | 42.951 | 42.886 | 42.890 | 42.436 | 42.727 | 43.073 |
| O | 3.935 | 4.220 | 4.208 | 3.675 | 3.663 | 3.928 |
| H | 0.016 | 0.020 | 0.009 | 0.020 | 0.028 | 0.016 |
| N | 0.025 | 0.061 | | 0.025 | 0.024 | 0.024 |
| Cl | | 0.119 | | | | |
| Br | | | | | | |
| I | | | | 0.382 | | |
| Total | 100.000 | 100.000 | 100.000 | 100.000 | 100.000 | 100.000 |
| (Si + B + P + Al)/F | 0.280 | 0.291 | 0.288 | 0.274 | 0.269 | 0.287 |
| Ba/Sr | 0.668 | 0.766 | 0.754 | 0.625 | 0.625 | 0.754 |
| Nd | 1.4389 | 1.4379 | 1.4390 | 1.4402 | 1.4383 | 1.4389 |
| vd | 94.4 | 94.0 | 94.8 | 96.5 | 94.7 | 96.0 |
| constant temperature test | ○ | ○ | ○ | ○ | ○ | ○ |
| Tm − Tx [° C.] | | | 39 | | | 33 |

TABLE 4

| element mass % | 19 | 20 | 21 | 22 | 23 |
|---|---|---|---|---|---|
| Si | 0.047 | 0.046 | | 0.078 | 0.046 |
| B | | | 0.115 | | |
| Al | 9.840 | 9.416 | 9.814 | 9.732 | 9.408 |
| P | 2.546 | 2.357 | 2.539 | 2.535 | 2.355 |
| Y | 1.731 | 3.031 | 3.039 | 3.047 | 3.028 |
| La | 1.418 | | | | |
| Gd | | | | | |
| Mg | 1.553 | 1.572 | 1.576 | 1.229 | 1.570 |
| Ca | 10.369 | 10.313 | 10.341 | 10.882 | 10.303 |
| Sr | 14.474 | 16.129 | 14.434 | 14.474 | 16.115 |
| Ba | 10.747 | 10.081 | 10.889 | 10.176 | 10.071 |
| Li | | | | 0.074 | |
| Na | | 0.038 | | | |
| K | 0.372 | 0.335 | 0.335 | 0.215 | 0.464 |
| Sb | | | | | |
| F | 42.919 | 42.989 | 43.057 | 43.482 | 42.950 |
| O | 3.946 | 3.653 | 3.936 | 3.929 | 3.650 |
| H | 0.013 | 0.016 | 0.016 | 0.007 | 0.016 |
| N | 0.025 | 0.024 | 0.024 | 0.025 | 0.024 |
| Cl | | | | | |
| Br | | | | | |
| I | | | | | |
| Total | 100.000 | 100.000 | 100.000 | 100.000 | 100.000 |
| (Si + B + P + Al)/F | 0.290 | 0.275 | 0.287 | 0.287 | 0.275 |
| Ba/Sr | 0.743 | 0.625 | 0.754 | 0.703 | 0.625 |
| Nd | 1.4445 | 1.4380 | 1.4388 | 1.4324 | 1.4380 |
| vd | 92.4 | 94.8 | 95.0 | 94.1 | 94.8 |
| constant temperature test | ○ | ○ | ○ | ○ | ○ |
| Tm − Tx [° C.] | | | 36 | | 25 |

TABLE 5

| element mass % | 1 | 2 | 3 | 4 | 5 | 6 |
|---|---|---|---|---|---|---|
| MgF$_2$ | 4.039 | 4.050 | 4.550 | 4.024 | 4.039 | 4.040 |
| CaF$_2$ | 20.145 | 20.200 | 20.700 | 20.072 | 20.145 | 21.142 |
| SrF$_2$ | 23.187 | 22.611 | 19.750 | 20.618 | 23.187 | 20.694 |
| BaF$_2$ | 12.905 | 12.940 | 14.800 | 13.851 | 13.284 | 12.905 |
| YF$_3$ | 4.986 | 4.000 | | 4.968 | 4.986 | 4.986 |
| AlF$_3$ | 27.254 | 27.328 | 28.329 | 28.148 | 27.007 | 28.251 |
| Al(PO$_3$)$_3$ | 6.714 | 6.732 | 7.834 | 7.186 | 6.582 | 7.212 |
| KHF$_2$ | 0.670 | 0.420 | | 0.668 | 0.670 | 0.670 |
| NH$_4$F•HF | 0.100 | 0.352 | 0.137 | 0.100 | 0.100 | 0.100 |
| K$_2$SiF$_6$ | | 0.367 | 0.200 | 0.365 | | |
| Na$_2$SiF$_6$ | | | | | | |
| LaF$_3$ | | | 1.700 | | | |
| GdF$_3$ | | 1.000 | 2.000 | | | |
| KCl | | | | | | |
| KBr | | | | | | |
| KI | | | | | | |
| LiBF$_4$ | | | | | | |
| BPO$_4$ | | | | | | |
| Total | 100.000 | 100.000 | 100.000 | 100.000 | 100.000 | 100.000 |
| (MgF$_2$ + CaF$_2$)/(Al(PO$_3$)$_3$ + AlF$_3$) | 0.712 | 0.712 | 0.698 | 0.682 | 0.720 | 0.710 |

TABLE 6

| element mass % | 7 | 8 | 9 | 10 | 11 | 12 |
|---|---|---|---|---|---|---|
| MgF$_2$ | 4.024 | 4.024 | 4.043 | 4.024 | 3.990 | 4.040 |
| CaF$_2$ | 21.065 | 21.065 | 20.165 | 22.059 | 20.950 | 20.145 |
| SrF$_2$ | 20.618 | 20.618 | 23.210 | 18.631 | 20.000 | 21.890 |
| BaF$_2$ | 12.858 | 13.851 | 12.758 | 13.355 | 13.940 | 11.908 |
| YF$_3$ | 4.471 | 3.975 | 4.991 | 4.968 | 4.500 | 4.986 |
| AlF$_3$ | 28.148 | 28.148 | 26.710 | 28.148 | 27.745 | 28.550 |
| Al(PO$_3$)$_3$ | 7.683 | 7.186 | 7.452 | 7.683 | 7.300 | 7.711 |
| KHF$_2$ | 0.668 | 0.668 | 0.671 | 0.668 | 0.675 | 0.670 |
| NH$_4$F•HF | 0.100 | 0.100 | | 0.099 | 0.100 | 0.100 |
| K$_2$SiF$_6$ | 0.365 | 0.365 | | 0.365 | 0.400 | |
| Na$_2$SiF$_6$ | | | | | | |
| LaF$_3$ | | | | | | |
| GdF$_3$ | | | | | | |
| KCl | | | | | | |

TABLE 6-continued

| element mass % | 7 | 8 | 9 | 10 | 11 | 12 |
|---|---|---|---|---|---|---|
| KBr | | | | | 0.400 | |
| KI | | | | | | |
| LiBF$_4$ | | | | | | |
| BPO$_4$ | | | | | | |
| Total | 100.000 | 100.000 | 100.000 | 100.000 | 100.000 | 100.000 |
| (MgF$_2$ + CaF$_2$)/ (Al(PO$_3$)$_3$ + AlF$_3$) | 0.700 | 0.710 | 0.709 | 0.728 | 0.712 | 0.667 |

Total 7

| element mass % | 13 | 14 | 15 | 16 | 17 | 18 |
|---|---|---|---|---|---|---|
| MgF$_2$ | 4.035 | 4.050 | 4.024 | 3.150 | 4.039 | 4.032 |
| CaF$_2$ | 21.142 | 21.200 | 20.072 | 20.200 | 20.145 | 20.108 |
| SrF$_2$ | 21.691 | 20.000 | 20.618 | 23.250 | 23.187 | 20.656 |
| BaF$_2$ | 12.905 | 13.640 | 13.851 | 12.940 | 12.905 | 13.877 |
| YF$_3$ | 4.986 | 4.500 | 4.968 | 5.000 | 4.986 | 4.977 |
| AlF$_3$ | 27.259 | 27.828 | 28.148 | 26.328 | 26.257 | 28.199 |
| Al(PO$_3$)$_3$ | 7.212 | 7.732 | 7.186 | 6.732 | 6.714 | 7.199 |
| KHF$_2$ | 0.670 | 0.200 | 0.668 | 1.000 | 1.667 | 0.669 |
| NH$_4$F·HF | 0.100 | 0.250 | | 0.100 | 0.100 | 0.100 |
| K$_2$SiF$_6$ | | 0.350 | | 0.400 | | 0.183 |
| Na$_2$SiF$_6$ | | | | 0.400 | | |
| LaF$_3$ | | | | | | |
| GdF$_3$ | | | | | | |
| KCl | | 0.250 | | | | |
| KBr | | | | | | |
| KI | | | | | 0.500 | |
| LiBF$_4$ | | | | | | |
| BPO$_4$ | | | 0.465 | | | |
| Total | 100.000 | 100.000 | 100.000 | 100.000 | 100.000 | 100.000 |
| (MgF$_2$ + CaF$_2$)/ (Al(PO$_3$)$_3$ + AlF$_3$) | 0.730 | 0.710 | 0.682 | 0.706 | 0.733 | 0.682 |

TABLE 8

| element mass % | 19 | 20 | 21 | 22 | 23 |
|---|---|---|---|---|---|
| MgF$_2$ | 3.980 | 4.026 | 4.040 | 3.150 | 4.024 |
| CaF$_2$ | 20.200 | 20.083 | 20.145 | 21.200 | 20.072 |
| SrF$_2$ | 20.750 | 23.115 | 20.694 | 20.750 | 23.102 |
| BaF$_2$ | 13.721 | 12.865 | 13.902 | 12.992 | 12.858 |
| YF$_3$ | 2.840 | 4.971 | 4.986 | 5.000 | 4.968 |
| AlF$_3$ | 28.328 | 27.169 | 28.251 | 28.000 | 27.154 |
| Al(PO$_3$)$_3$ | 7.232 | 6.693 | 7.212 | 7.200 | 6.689 |
| KHF$_2$ | 0.482 | 0.668 | 0.670 | | 0.668 |
| NH$_4$F·HF | 0.100 | 0.099 | 0.100 | 0.100 | 0.100 |
| K$_2$SiF$_6$ | 0.367 | | | 0.608 | 0.365 |
| Na$_2$SiF$_6$ | | 0.311 | | | |
| LaF$_3$ | 2.000 | | | | |
| GdF$_3$ | | | | | |
| KCl | | | | | |
| KBr | | | | | |
| KI | | | | | |
| LiBF$_4$ | | | | 1.000 | |
| BPO$_4$ | | | | | |
| Total | 100.000 | 100.000 | 100.000 | 100.000 | 100.000 |
| (MgF$_2$ + CaF$_2$)/ (Al(PO$_3$)$_3$ + AlF$_3$) | 0.680 | 0.712 | 0.682 | 0.692 | 0.712 |

TABLE 9

| element mass % | A | B | C | D | E |
|---|---|---|---|---|---|
| Al | 8.63 | 11.70 | 10.87 | 10.02 | 9.32 |
| P | 2.26 | 3.68 | 2.27 | 1.79 | 2.37 |
| Y | 3.16 | | | 1.19 | 3.05 |
| Mg | 1.61 | 2.34 | 2.30 | 1.81 | 1.81 |
| Ca | 10.68 | 6.67 | 6.87 | 12.03 | 11.63 |
| Sr | 16.70 | 13.95 | 13.87 | 16.26 | 15.44 |
| Ba | 11.53 | 12.48 | 17.09 | 8.64 | 8.58 |
| Na | | 0.82 | 0.44 | 0.55 | 0.56 |
| F | 41.91 | 42.65 | 42.77 | 44.94 | 43.57 |
| O | 3.52 | 5.71 | 3.52 | 2.77 | 3.67 |
| Total | 100.00 | 100.00 | 100.00 | 100.00 | 100.00 |
| (Si + B + P + Al)/F | 0.260 | 0.361 | 0.307 | 0.263 | 0.268 |
| Ba/Sr | 0.690 | 0.895 | 1.232 | 0.531 | 0.556 |
| Nd | 1.4382 | 1.4366 | 1.4280 | 1.4280 | 1.4377 |
| νd | 95.2 | 94.7 | 94.9 | 96.8 | 95.4 |
| constant temperature test | X | — | X | X | ○ |
| Tm – Tx [° C.] | | — | | | 6 |

TABLE 10

| element mass % | A | B | C | D | E |
|---|---|---|---|---|---|
| MgF$_2$ | 4.14 | 6.00 | 5.90 | 4.63 | 4.64 |
| CaF$_2$ | 20.84 | 13.00 | 13.40 | 23.43 | 22.65 |
| SrF$_2$ | 23.96 | 20.00 | 19.90 | 23.32 | 22.14 |
| BaF$_2$ | 14.36 | 10.00 | 15.90 | 5.97 | 4.24 |
| YF$_3$ | 5.20 | | | 1.96 | 5.00 |
| AlF$_3$ | 24.84 | 35.00 | 33.70 | 31.18 | 29.01 |
| Al(PO$_3$)$_3$ | 6.36 | 4.50 | 0.50 | | |
| BaO | 0.30 | | | | |
| Ba(PO$_3$)$_2$ | | 10.00 | 10.00 | 8.53 | 11.30 |
| NaF | | 1.50 | 0.80 | 1.00 | 1.02 |
| Total | 100.00 | 100.00 | 100.10 | 100.02 | 100.00 |
| (MgF$_2$ + CaF$_2$)/ (Al(PO$_3$)$_3$ + AlF$_3$) | 0.801 | 0.481 | 0.564 | 0.900 | 0.941 |

TABLE 11

| | devitrification disappearing temperature (Tm) | devitrification temperature (Tx) | Tm – Tx | heat generation start temperature | |
|---|---|---|---|---|---|
| | | | | −5° C./min. | −10° C./min. |
| Example 1 | 720 | 702 | 18 | 686.1 | 670.3 |
| Comparative Example D | 685 | 679 | 6 | 662.1 | 645.0 |

As shown in Tables 1-8, the glasses of the examples of the present invention were found to have sufficient resistance to devitrification suitable for continuous production while realizing desired optical constants. According to the Powder Method acid-proof test, all of the examples were ranked as Class 3. On the other hand, Comparative Examples A and D shown in Table 9 realized the required optical constants but the ratio (Si+B+P+Al)/F in mass % on element basis of a total mass of glass materials was smaller than 0.27 and the ratio (MgF$_2$+CaF$_2$)/(Al(PO$_3$)$_3$+AlF$_3$) is larger than 0.77 and, therefore, resistance to devitrification of the glass was not sufficient and occurrence of devitrification in the inside of the glass was confirmed by the temperature holding test for 60 hours at 690° C.

Comparative Examples B and C had a larger ratio (Si+B+P+Al)/F than 0.30 and resistance to devitrification was not sufficient and, therefore, a transparent glass was not obtained in Comparative Example B (crystals precipitated in the inside of the glass and the glass became opaque). In Comparative Example C, in addition to occurrence of such precipitation of crystals, the result of the Powder Method was Class 4 due to a large amount of Ba in the glass. In Comparative Example E, the ratio (Si+B+P+Al)/F, the ratio Ba/Sr and the ratio (MgF$_2$+CaF$_2$)/(Al(PO$_3$)$_3$+AlF$_3$) were slightly out of preferable ranges respectively but occurrence of devitrification was not observed in the inside of the glass in the constant temperature test for 60 hours at 690° C. In this glass, however, glass viscosity at 690° C. was very low and, at this temperature, a striped ununiform portion (striae) due to a convection current in flowing glass is likely to be produced and, as a result, a highly homogeneous optical glass will not be produced. (Tm−Tx) of this glass measured by DTA is 6° C. and, from this fact, it is considered difficult to increase the glass viscosity during forming of the glass.

The glasses of the examples shown in Tables 1-8 were processed by cold working or reheat pressing and various lenses and prisms were formed without occurrence of devitrification in the inside of the glass. Precision mold pressing was also conducted with respect to the glasses of the examples in which glass softening temperature was relatively low and it was possible to produce excellent lenses by mold pressing.

The lenses and prisms produced in the above described manner were mounted on cameras and projectors and image formation properties were examined. As a result, it was found that an optical system having a small chromatic aberration in the visible region could be realized.

The above described examples are shown for illustrative purposes only and it will be understood that various modifications can be made by those skilled in the art without departing from the spirit and scope of the present invention.

INDUSTRIAL APPLICABILITY

According to the present invention, a ultra-low refractive index and ultra-low dispersion optical glass having a refractive index (nd) within a range from 1.41 to 1.47 and an Abbe number (vd) within a range from 90 to 100 which is suitable for projection lenses and prisms of optical instruments represented by cameras and projectors for which a high precision chromatic aberration is required can be produced stably without occurrence of devitrification (precipitation of crystals) in cooling from a glass melt which was a serious problem in manufacture of glass. By using this optical glass, lenses and prisms of high precision cameras and image projection (reproduction) instruments such as projectors can be produced on a stable basis.

The invention claimed is:

1. An optical glass obtained by melting a glass material composition comprising, in mass % on element basis of a total mass of glass materials:

| | |
|---|---|
| P introduced from a complex phosphate material | 1.0-5.0% |
| Al introduced from a material which comprises a complex phosphate and/or a fluoride | 3.0-19.0% |
| Mg introduced from a material which comprises a complex phosphate and/or a fluoride | 0.3-4.0% |
| Ca introduced from a material which comprises a complex phosphate and/or a fluoride | 3.0-less than 17.5% |
| Sr introduced from a material which comprises a complex phosphate and/or a fluoride | 8.0-19.0% |
| Ba introduced from a material which comprises a complex phosphate and/or a fluoride | 4.8-18.0% |
| where (Sr + Ba) which is a sum in mass % | 20.0-35.0% |
| Y introduced from a material which comprises a fluoride | 0.5-6.0% |
| La introduced from a material which comprises a fluoride | 0-4.0% |
| Gd introduced from a material which comprises a fluoride | 0-4.0% |
| Li introduced from a material which comprises a fluoride | 0-2.0% |
| Na introduced from a material which comprises a fluoride | 0-2.0% |
| K introduced from a material which comprises a fluoride | 0-1.0% |
| F introduced from a material which comprises a fluoride | 40-55% |
| Cl introduced from a chloride material | 0-1.0% |
| Br introduced from a bromide material | 0-1.0% |
| I introduced from an iodide material | 0-1.0% |
| O introduced from complex phosphate and oxide materials | 0.5-8% |
| Si | less than 0.2% |
| B | less than 0.5% |
| Sb | 3% or below | wherein (Si +B +P +Al)/F is adjusted to a value within a range from 0.27 to 0.35 and Ba/Sr is adjusted to a value within a range from 0.6 to 1.0 wherein the optical glass has a refractive index (nd) within a range from 1.41 to 1.47 and an Abbe number (vd) within a range from 90 to 100.

2. An optical glass as defined in claim 1, wherein the optical glass comprises in mass % on element basis: O 1.0-8%.

3. An optical glass as defined in claim 1, wherein the optical glass has a refractive index (nd) within a range from 1.42 to 1.46 and an Abbe number (vd) within a range from 92 to 98.

4. An optical glass as defined in claim 1 which is obtained by melting a glass material composition wherein (Si+B+P+Al)/F in mass % on element basis of a total mass of glass materials is adjusted to a value within a range from 0.18 to 0.37, said glass material composition comprising in mass % of the total mass of glass materials:

| | |
|---|---|
| Al(PO$_3$)$_3$ | 2.0-10.0% |
| AlF$_3$ | 20-35% |
| CaF$_2$ | 15-25% |
| SrF$_2$ | 15-28% |
| BaF$_2$ | 5-20% and |
| YF$_3$ | 0.1-10.0%. |

5. An optical glass which is obtained by melting a glass material composition wherein (Si+B+P+Al)/F in mass % on element basis of a total mass of glass materials is adjusted to a value within a range from 0.18 to 0.37 and Ba/Sr is adjusted to a value within a range from 0.6 to 1.0, said glass material composition comprising in mass % of a total mass of glass materials:

| | |
|---|---|
| Al(PO$_3$)$_3$ | 2.5-10.0% |
| AlF$_3$ | 22-33% |
| MgF$_2$ | 1.0-7.0% |
| CaF$_2$ | 16-24% |
| where (MgF$_2$ + CaF$_2$)/(Al (PO$_3$)$_3$ + AlF$_3$) in mass % is less than 0.77 | |
| SrF$_2$ | 15.5-27% |
| BaF$_2$ | 6-18% and |
| YF$_3$ | 0.5-9.0%. |

6. An optical glass as defined in claim 1 which comprises Si and/or B in a total amount within a range from 0.005% to less than 0.2% which are introduced from materials excluding oxides.

7. An optical glass as defined in claim 1 obtained by melting a glass material composition which is free of $SiO_2$, $B_2O_3$, $Ba(PO_3)_2$, $BaCl_2$, LiF, NaF, KF, $LiPF_6$, $NaPF_6$ and $KPF_6$.

8. An optical glass as defined in claim 5, wherein the optical glass has a refractive index (nd) within a range from 1.42 to 1.46 and an Abbe number (vd) within a range from 92 to 98 which is obtained by melting a glass material composition wherein (Si +B +P +Al)/F in mass % on element basis of a total mass of glass materials is adjusted to a value within a range from 0.18 to 0.37 and Ba/Sr is adjusted to a value within a range from 0.6 to 1.0, said glass material composition comprising in mass % of a total mass of glass materials:

| | |
|---|---|
| $Al(PO_3)_3$ | 2.5-10.0% |
| $AlF_3$ | 22-33% |
| $MgF_2$ | 1.0-7.0% |
| $CaF_2$ | 16-24% |
| where $(MgF_2 + CaF_2)/(Al(PO_3)_3 + AlF_3)$ in mass % is less than 0.73 | |
| $SrF_2$ | 15.5-27% |
| $BaF_2$ | 6-18% |
| $YF_3$ | 0.5-9.0% |
| $Na_2SiF_6$ | 0-3.0% |
| $K_2SiF_6$ | 0-3.0% |
| where $(NaSiF_6 + K_2SiF_6)$ which is a sum in mass % | 0.01-5.0% |
| $KHF_2$ | 0.1-3.0% and |
| $NH_4F \cdot HF$ | 0-1.0% | and said glass material composition being free of $SiO_2$, $B_2O_3$, $Ba(PO_3)_2$, $BaCl_2$, LiF, NaF, KF, $LiPF_6$, $NaPF_6$ and $KPF_6$.

9. An optical glass as defined in claim 8 comprising in mass % of a total mass of the glass materials:

| | |
|---|---|
| $Na_2SiF_6$ | 0-3.0% |
| $K_2SiF_6$ | 0-3.0% |
| where $(NaSiF_6 + K_2SiF_6)$ is | 0.03-4.0%. |

10. An optical glass as defined in claim 1 wherein devitrification does not occur inside of the glass when the glass is melted at 1000° C. and cooled to 690° C. and then is held for 60 hours at 690° C.

11. An optical glass as defined in claim 1 wherein difference between devitrification disappearing temperature (Tm) during the temperature elevation process and devitrification temperature (Tx) which is calculated from devitrification starting temperature during the temperature falling process in DTA measurement is 15° C. or over.

12. An optical glass as defined in claim 1 wherein acid-proof property of the glass measured in accordance with JOGIS 06$^{1999}$ "Method for Measuring Chemical Durability of Optical Glass (Powder Method)" is Class 1 to Class 3.

13. An optical glass as defined in claim 1, wherein the optical glass is included in an optical element.

14. An optical glass as defined in claim 1, wherein the optical glass is reheat pressed and included in an optical element.

15. An optical substrate material made of an optical glass as defined in claim 1, wherein the optical glass is included in an optical instrument.

* * * * *